(12) United States Patent
Quaade et al.

(10) Patent No.: US 8,916,493 B2
(45) Date of Patent: Dec. 23, 2014

(54) ADDITIVES FOR HIGHLY COMPACTED AMMONIA STORAGE MATERIALS

(75) Inventors: Ulrich Quaade, Bagsvaerd (DK); Jakob Svagin, Frederiksberg (DK); Johnny Johansen, Copenhagen (DK); Ryan Bradley, Soborg (DK)

(73) Assignee: Amminex Emissions Technology A/S, Soborg (DK)

(*) Notice: Subject to any disclaimer, the term of this patent is extended or adjusted under 35 U.S.C. 154(b) by 260 days.

(21) Appl. No.: 13/061,961

(22) PCT Filed: Sep. 7, 2009

(86) PCT No.: PCT/EP2009/006471
§ 371 (c)(1),
(2), (4) Date: May 24, 2011

(87) PCT Pub. No.: WO2010/025948
PCT Pub. Date: Mar. 11, 2010

(65) Prior Publication Data
US 2011/0218095 A1 Sep. 8, 2011

Related U.S. Application Data

(60) Provisional application No. 61/103,309, filed on Oct. 7, 2008.

(30) Foreign Application Priority Data
Sep. 8, 2008 (EP) .................... 08015789

(51) Int. Cl.
*C01B 31/08* (2006.01)
*B01J 20/00* (2006.01)
(Continued)

(52) U.S. Cl.
CPC ............ *B01J 20/30* (2013.01); *B01J 20/28042* (2013.01); *B01J 2220/66* (2013.01); *B01J 20/046* (2013.01); *B01D 53/9481* (2013.01); *B01J 20/3042* (2013.01); *B01J 20/3092* (2013.01); *B01J 20/20* (2013.01); *B01J 20/0288* (2013.01); *B01J 20/3007* (2013.01); *B01J 20/04* (2013.01); *B01D 53/9418* (2013.01); *B01J 20/205* (2013.01); *F25B 17/08* (2013.01); *C01C 1/006* (2013.01); *B01D 2257/406* (2013.01); *B01J 20/02* (2013.01)
USPC ............ 502/417; 502/400; 502/414; 502/416

(58) Field of Classification Search
USPC .............. 502/400, 414, 416, 417; 95/91, 128; 96/108, 118
See application file for complete search history.

(56) References Cited

U.S. PATENT DOCUMENTS

| 2,019,356 A | 10/1935 | Berzelius |
| 4,439,994 A | 4/1984 | Briley |

(Continued)

FOREIGN PATENT DOCUMENTS

| GB | 417 044 | 9/1934 |
| WO | WO 99/01205 | 1/1999 |

(Continued)

OTHER PUBLICATIONS

Anonymus, "VDI-Wämeatlas," VDI Verlag, Dusseldorf, Germany (1994).
International Search Report dated Oct. 23, 2009 for Application No. PCT/EP2009/006470.
International Search Report dated Nov. 3, 2009 for Application No. PCT/EP2009/006471.

(Continued)

*Primary Examiner* — Anthony J Zimmer
(74) *Attorney, Agent, or Firm* — Frost Brown Todd LLC

(57) ABSTRACT

Disclosed is a self-supporting solid compacted composition of material comprising an ammonia storage material capable of reversibly absorbing and desorbing ammonia in its ammonia saturated state and compacted to such a density that it has of at least 70% of the single crystal density of said material in its ammonia-saturated state in admixture with one or more additive incapable of storing ammonia and having a thermal conductivity of at least five times the thermal conductivity of the ammonia storage material at a temperature of from at least −45° C. to 250° C., as well as a process for preparing it.

9 Claims, 2 Drawing Sheets

(51) Int. Cl.
*B01J 20/28* (2006.01)
*B01J 20/04* (2006.01)
*B01D 53/94* (2006.01)
*B01J 20/30* (2006.01)
*B01J 20/20* (2006.01)
*B01J 20/02* (2006.01)
*C01C 1/00* (2006.01)
*F25B 17/08* (2006.01)

(56) References Cited

U.S. PATENT DOCUMENTS

| | | | | |
|---|---|---|---|---|
| 5,298,231 | A | * | 3/1994 | Rockenfeller ............... 423/299 |
| 5,384,101 | A | | 1/1995 | Rockenfeller |
| 5,441,716 | A | | 8/1995 | Rockenfeller |
| 5,626,650 | A | * | 5/1997 | Rodriguez et al. ............. 95/116 |
| 5,728,368 | A | | 3/1998 | Bou et al. |
| 5,875,648 | A | | 3/1999 | Boye et al. |
| 5,993,766 | A | * | 11/1999 | Tom et al. .................... 423/294 |
| 6,863,713 | B1 | * | 3/2005 | Ghosal et al. ................... 95/117 |
| 7,927,406 | B2 | * | 4/2011 | Takeuchi ........................ 96/108 |
| 2001/0000858 | A1 | * | 5/2001 | Rockenfeller et al. .......... 95/116 |
| 2005/0092176 | A1 | * | 5/2005 | Ding et al. ........................ 95/90 |
| 2008/0295695 | A1 | * | 12/2008 | Takeuchi ........................ 96/108 |

FOREIGN PATENT DOCUMENTS

| | | |
|---|---|---|
| WO | WO 2006/012903 | 2/2006 |
| WO | WO 2006/081824 | 8/2006 |

OTHER PUBLICATIONS

Johannessen, T. et al., "Ammonia Storage and Delivery Systems for Automotive NOx Aftertreatment," SAE Technical Paper Series, vol. SP-2154 (2008-01-1027) (Apr. 14, 2008) pp. 1-8.

Lopez, J. et al., "Composites graphite/sel pour le stockage d'énergie à haute température: etude des effects du graphite et de la microstructure des composites sur les propriètès de changement de phase des sels," C.R. Mecanique, vol. 336(7) (Jun. 3, 2008) pp. 578-585.

Mauren, S. et al., "Optimisation des densitès ènergètiques de systems de stockage chimique bases sur des rèactions solide-gaz renversables," Revue De Physique Appliquee (Jan. 1, 1983) pp. 107-112.

Sørensen, J.S. et al., Reversible High-Density Hydrogen Storage in Compact Metal Ammine Salts, J. Am. Chem. Soc., vol. 130(27) (Jun. 13, 2008) pp. 8660-8668. http://pubs.acs.org/doi/pdf/10.1021/ja076762c.

Uher, C., Landolt-Börnstein—Group III Condensed Matter, Numerical Data and functional Relationship in Science and Technology Thermal Conductivity of Pure Metals and Alloys, pp. 431-439.

Wang, K. et al., "Effective thermal conductivity of expanded graphite-$CaCl_2$ composite absorbent for chemical adsorption chillers," Energy Conversion and Management, vol. 47 (2006) pp. 1902-1912.

Written Opinion dated Aug. 3, 2011 for Application No. PCT/EP2009/006470.

Written Opinion dated Mar. 11, 2009 for Application No. PCT/EP/2009/006471.

* cited by examiner

ADDITIVES FOR HIGHLY COMPACTED AMMONIA STORAGE MATERIALS

This application is related to and claims priority from U.S. Provisional Patent Application No. 61/103,309, filed Oct. 7, 2008, incorporated herein by reference.

FIELD OF THE INVENTION

The present invention relates to highly compacted ammonia storage materials containing certain additives, and to the manufacture of the materials.

DESCRIPTION OF THE RELATED ART

Ammonia storage materials are materials which can ad- or absorb ammonia and release it e.g. upon heating or by being subjected to a vacuum. Thus, they may be used for storing ammonia by ad- or absorption, which is usually exothermic, and release it on demand.

In WO 2006/081824 A2 a highly compacted ammonia storage material for use as an ammonia absorbing/desorbing agent in various applications demanding an ammonia delivery, e.g. ammonia delivery to SCR catalysts for reducing $NO_x$, and a method for its preparation is described. This application also discloses that the ammonia storage material may be mixed with a binder in order to facilitate the compaction procedure and to enhance the cohesiveness and the mechanical stability of the compacted material. It is mentioned that suitable binders are inert fibers that do not adversely affect the absorption/desorption of ammonia. As an example fibers of $SiO_2$ are given.

SUMMARY OF THE INVENTION

The present invention relates to a self-supporting solid compacted composition of material comprising an ammonia storage material capable of reversibly absorbing and desorbing ammonia in its ammonia-saturated state and compacted to such a degree that it has a density of at least 70% of the single crystal density of said material in its ammonia-saturated state in admixture with an additive incapable of storing ammonia and having a thermal conductivity of at least five times the thermal conductivity of the ammonia storage material at a temperature of from at least −45° C. to 250° C.

The invention further pertains to a method of preparing the above-mentioned compacted composition of material comprising the ammonia storage material and the additive, the method comprising:
  a) providing a solid ammonia storage material reversibly absorbing and desorbing ammonia in its ammonia-saturated state;
  b) mixing the material of a) with an additive incapable of storing ammonia and having a thermal conductivity of at least five times the thermal conductivity of the ammonia storage material;
  c) compacting said mixture to a degree wherein said ammonia storage material in its ammonia saturated state has a density of at least 70% of the single crystal density of said material in its saturated state using external pressure.

DESCRIPTION OF THE EMBODIMENTS

Figure 1:
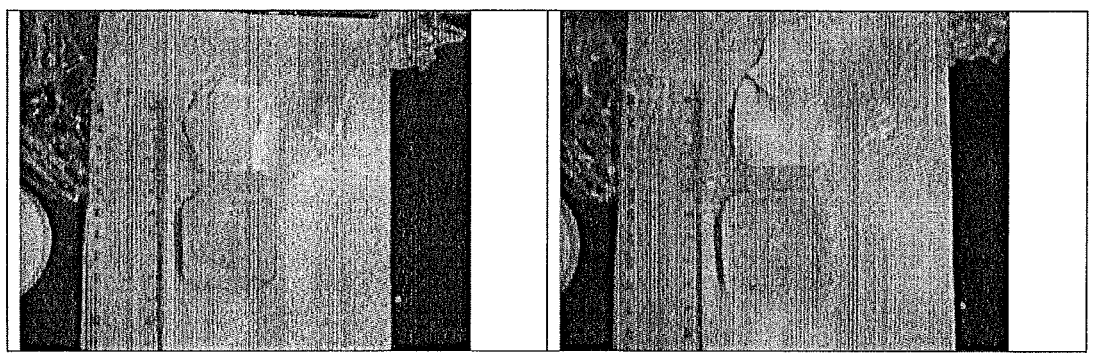
FIG. 1 shows photographs of pressed blocks of $Sr(NH_3)_8Cl_2$ after complete degassing of ammonia; A: lower block: remaining $SrCl_2$ mixed with 10% by weight carbon fiber; upper block: remaining pure $SrCl_2$. B: lower block $SrCl_2$ mixed with 10% by weight aluminium powder; upper block: pure $SrCl_2$.

The present invention relates to a self-supporting solid compacted composition of material comprising an ammonia storage material reversibly absorbing and desorbing ammonia having in its ammonia saturated state a density of at least 70% of the single crystal density of said material in its saturated state in admixture with an additive incapable of storing ammonia and having a thermal conductivity of at least five times the thermal conductivity of the ammonia storage material at a temperature of from at least −45° C. to 250° C., and a process for preparing it.

The thermal conductivity of the additive is at least five times higher, more preferably at least ten times higher than that of the ammonia storage material.

Preferably the additive material is non-reactive with ammonia, however, a superficial passivating reaction with ammonia is also acceptable.

The binder material in WO 2006/081824 A2 used in the compacted materials described therein serves the purpose to facilitate the compaction procedure and to enhance the cohesiveness and the mechanical stability of the compacted material. As suitable materials inert fibers are mentioned, and only $SiO_2$ fibers are given as an example.

WO 2006/081824 A2 does not disclose that thermal conductivity might be an important characteristics of a material used as a binder (or additive). Indeed, it is well known that $SiO_2$ has a poor thermal conductivity.

In the present invention it was recognized that a good thermal conductivity is just as important as good mechanical properties for a material used as a binder or additive in a self-supporting composition comprising an ammonia storage material. The degassing process, which necessitates heating, of a self-supporting highly compacted ammonia storage material starts from the exposed surfaces thereof and then gradually progresses into the bulk of the material, the outer layers shrinking and becoming porous upon ammonia depletion faster than the inner layers. As a result, the thermal conductivity of the material from the outer layers to the inner parts of the compacted material is diminished more and more, and heating of the outer ammonia saturated regions becomes difficult. To compensate for this the inner parts have to be heated to a higher temperature and the response time of the system becomes longer.

This problem can be mitigated by adding a thermally conductive material. Furthermore, the initial heating of the self-supporting compacted ammonia storage material is facilitated when it contains a thermally conductive additive.

Non-limiting examples of suitable thermally conducting additives are metals, semiconductors, certain insulators such as silicon carbide, carbon fibers, carbon, graphite and other carbon modifications such as synthetic diamond, fullerenes and carbon nanotubes, and thermally conductive (co)polymers and/or (co)polymer blends with non-polymeric materials. Oxides are in principle feasible, but less preferred. Light materials such as silicon, aluminum, carbon, carbon fibers, graphite and other carbon modifications, such as fullerenes and carbon nanotubes, are particularly advantageous. Among those, aluminum, e.g. in form of powder or flakes, graphite and carbon fibers are preferred.

Besides having a thermal conductivity higher than that of the ammonia storage material the additive should advantageously show good mechanical properties.

Figure 2:
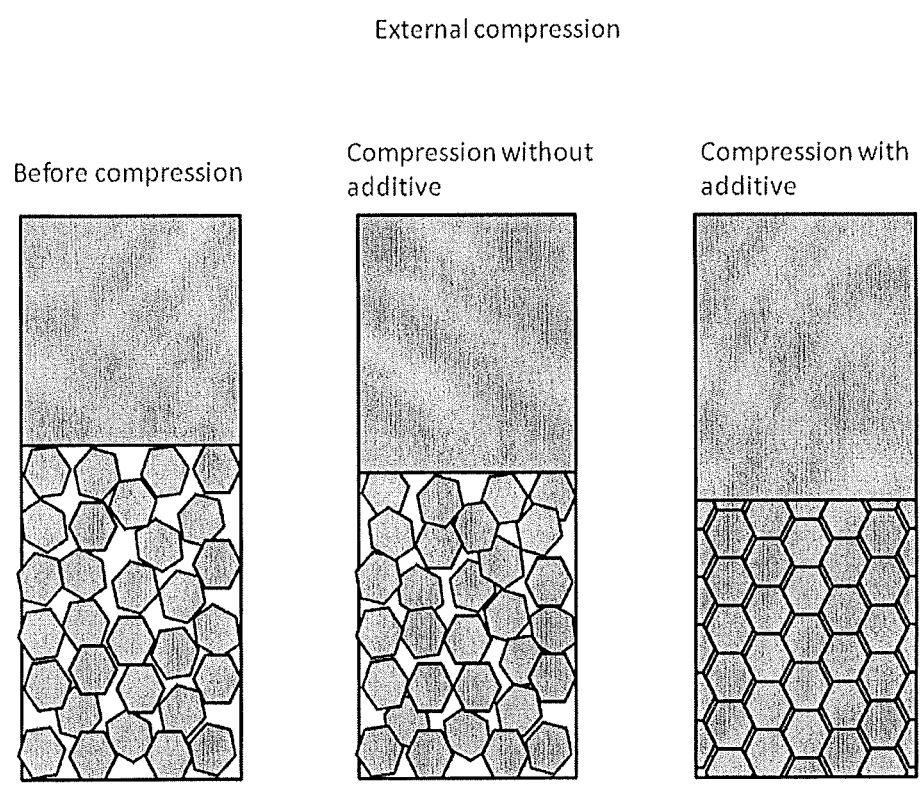
FIG. 2 is a schematic illustration of the effect on the compression efficiency of an additive according to the invention.

In particular, the compaction procedure should be facilitated, i.e. the additive should provide for a smoother compression of the ammonia storage material (see FIG. 2), and the mechanical stability of the compacted material, particularly when depleted of ammonia, should be improved, e.g. breaking into pieces of the material should be inhibited.

Accordingly, the additive should mix well with the ammonia storage material and have a lubricating effect between grain boundaries of the ammonia storage material thus improving grain boundary mobility during compaction, while having a stiction effect between grains, once the ammonia storage material is compacted to a coherent mass. By this, the compacted material will have an improved mechanical stability.

Thus, the material should show a combination of good mechanical and thermal conductivity properties when added to an ammonia storage material.

This can by achieved by adding an additive according to the invention to an ammonia storage material. Aluminum and carbon fibers are particularly suited for the purposes of the present invention.

FIG. 1 shows that additives according to the invention are indeed capable of improving the mechanical stability of an ammonia storage material to a great degree. This Figure shows photographs of pressed blocks of $Sr(NH_3)_8Cl_2$ after complete degassing of ammonia; A: lower block: remaining $SrCl_2$ mixed with 10% by weight carbon fiber; upper block: remaining pure $SrCl_2$. B: lower block $SrCl_2$ mixed with 10% by weight aluminium powder; upper block: pure $SrCl_2$. The improvement of the mechanical stability upon adding an additive according to the invention can clearly be seen. The pure material breaks into pieces after the ammonia has been release completely, whereas the compositions of material comprising an additive according to the invention and the depleted ammonia storage material retain their structural integrity.

In general, the additive may be added in the form of e.g. powder, flakes, fibers, wires, platelets, etc. Preferably the additive is a non-porous material having finite, preferably small dimensions of less than about 15 mm, particularly about 0.5 to 10 mm in the longest direction (i.e. is not e.g. a web, wool, tuft or similar material that could cause voids) so as to avoid a significant reduction of partial ammonia density in the composition of material.

Furthermore, it was recognized that shapes of material other than fibers are sometimes more useful for improving mechanical properties and thermal conductivity, and therefore shapes other than fibers are often preferred, with the exception of carbon fibers which are a preferred form of an additive, since this specific fiber based on its very good lubricating properties and thermal conductivity is particularly suitable for the present invention.

The combination of the additive and ammonia storage material are preferably chosen such that the materials mix well and do not segregate over the time upon mechanical disturbance. For example, $CaCl_2$ and aluminium powder may be mixed in any ratio, and $CaCl_2$ granules or pellets having a diameter of e.g. 0.5-10 mm and aluminium powder mix well up to about 10% aluminium powder, whereas they do not mix well with aluminium flakes or granules.

The amount of the additive should be such that the partial ammonia density in the mixture (composition of material) is not reduced to a significant degree. This will, in general be an amount up to about 40% by volume, or up to about 30 or 20% by volume, preferably up to about 10% by volume. In another embodiment, particularly with light weight additives, the amount may be up to about 45%, 40%, 30%, 20% by weight and specifically from about 5 to about 10% by weight.

The ammonia storage material capable of reversibly absorbing and desorbing ammonia is present in the compacted composition of material in its ammonia-saturated state, which is intended to mean that all or nearly all coordination sites for ammonia in the ammonia storage material are occupied.

Furthermore, the ammonia storage material is compacted to such a degree that it has as density of at least 70% of the single crystal density. With "single crystal density" is meant the density of a single crystal, i.e. a crystalline material having no pores, voids, interstices and even crystal defects that may reduce the density. The "density" of solid materials normally referred to in the scientific literature is usually the single crystal density. Here the term "single crystal density" is used to differentiate from the density of the compacted material, which is not the "density" normally referred to in the literature, but the actually measured density (which is an average density) of the compacted material which still may have pores, interstices and other void as well as crystal defects.

Other preferred densities of the compacted ammonia storage material are 75%, 80%, 85%, 90%, 92%, 95%, 98% and even more than 98% of the single crystal density.

The ammonia storage material capable of reversibly absorbing and desorbing ammonia may be an ionic salt reversibly absorbing and desorbing ammonia. Specific salts in their ammonia-saturated state (also known as metal ammine complexes) are of the general formula: $M_a(NH_3)_nX_z$, wherein M is one or more cations selected from alkali metals such as Li, Na, K or Cs, alkaline earth metals such as Mg, Ca, Ba or Sr, aluminum and transition metals such as V, Cr, Mn, Fe, Co, Ni, Cu or Zn or combinations thereof such as NaAl, KAl, $K_2$Zn, CsCu or $K_2$Fe, X is one or more anions selected from fluoride, chloride, bromide, iodide, nitrate, thiocyanate, sulphate, molybdate and phosphate ions, a is the number of cations per salt molecule, z is the number of anions per salt molecule such that the salt is neutral, and n is the coordination number of 2 to 12, depending on the specific cation.

Typical ammonia contents of the metal ammine complexes partially of fully saturated with ammonia are in the range of 20 to 60% by weight ammonia, and preferred complexes comprise above 30% by weight ammonia, more preferred above 40% by weight ammonia. The inexpensive compound $Mg(NH_3)_6Cl_2$ contains 51.7 wt % ammonia. A similar inexpensive compound based on $CaCl_2$, i.e. $Ca(NH_3)_8Cl_2$ contains 55% by weight ammonia.

Preferred ammonia storage materials capable of reversibly absorbing and desorbing ammonia are $Mg(NH_3)_6Cl_2$ (in its unsaturated form: $MgCl_2$), $Ca(NH_3)_8Cl_2$ (in its unsaturated form: $CaCl_2$) and $Sr(NH_3)_8Cl_2$ (in its unsaturated form: $SrCl_2$).

The ammonia storage material capable of reversibly absorbing and desorbing ammonia is saturated with ammonia before it is compacted. This may be achieved by variety of means, e.g by simply exposing spread out unsaturated ammonia storage material to ammonia, by rotating unsaturated ammonia storage material in a drum and introducing ammonia into the drum and the like.

Compacting and shaping of the saturated solid storage material, which may be in the form of powder, granules, pellets, polycrystalline material, amorphous material lumps etc., may suitably be carried out in a manner known per se by external compression, such as pressing, injection moulding, extrusion or monolith preparation.

In the case of pressing, a pressure might be applied in several different ways in a manner known per se. In a preferred embodiment of the invention the solid material is compacted and shaped in a mould using mechanical pressure. In one embodiment, the material is compressed to shapes like dense blocks or tablets or any other suitable desired shapes such as rings by placing the saturated salt in a groove/dent/hole/pit in a metal block (e.g. in a cylindrical hole) and applying pressure to compress the material using a piston pressed against the initially porous, granular, powdery etc. solid. The pressure applied may be up to several tons per cm$^2$, e.g. 2-4 tons/cm$^2$.

The compacted solid ammonia storage material can be prepared e.g. in the form of cylinders, rods, cubes, rectangular shaped blocks or other shapes having overall dimensions suitable to the desired ammonia consumption in the ammonia consuming unit. For some applications requiring only a small amount of ammonia, the weight of the compacted storage unit may be below 10 g. In other applications requiring large amounts of ammonia, the rods/blocks/cylinders (or other shapes) may even be above 100 kg in weight. The corresponding volume of the units may also vary from below 1 cm$^3$ to above 1000 liters.

The following non-limiting examples are given for a further illustration of the invention.

EXAMPLES

Example 1

The following table shows the effect on the thermal conductivity ($\lambda$) for different amounts of aluminium powder added to CaCl$_2$ storage material. The aluminum concentration is given relative to the mass of salt in the sample. Values for both saturated and degassed material are given.

TABLE 1

| Aluminum loading | NH$_3$ Loading | $\lambda$ (W/m K) |
|---|---|---|
| 0% | saturated | 0.4 |
| 0% | outgassed | 0.15 |
| 8% | saturated | 0.55 |
| 8% | outgassed | 0.25 |
| 20% | saturated | 0.8 |
| 20% | outgassed | 0.57 |

Example 2

The following table shows the effect on the thermal conductivity ($\lambda$) for SrCl$_2$ mixed with different additives

TABLE 2

| Additive loading | NH$_3$ Loading | $\lambda$ (W/m K) |
|---|---|---|
| No additive | saturated | 0.48 |
| No additive | degassed | 0.10 |
| 10% aluminum | saturated | 0.51 |
| 10% aluminum | degassed | 0.17 |
| 10% carbon fiber | saturated | 0.85 |
| 10% carbon fiber | degassed | 0.16 |

All documents cited in this specification, such as patents, patent applications and journal articles, are herein incorporated by reference in their entirety.

The invention claimed is:

1. A self-supporting solid compacted composition of material comprising an ammonia storage material capable of reversibly absorbing and desorbing ammonia which ammonia storage material is in its ammonia-saturated state, wherein the ammonia storage material is selected from a material having the general formula: $M_a(NH_3)_nX_z$, wherein M is one or more cations selected from alkali metals, alkaline earth metals, aluminum and transition metals and combinations thereof, X is one or more anions selected from fluoride, chloride, bromide, iodide, nitrate, thiocyanate, sulphate, molybdate and phosphate ions, a is the number of cations per salt molecule, z is the number of anions per salt molecule such that the salt is neutral, and n is the coordination number of 2 to 12 depending on the specific cation, and which ammonia storage material is compacted to such degree that it has a density of at least 70% of the single crystal density of said ammonia storage material in its ammonia-saturated state, said ammonia storage material being in admixture with an additive of carbon fibers.

2. The composition of material of claim 1 wherein the ammonia storage material in its saturated form is selected from Mg(NH$_3$)$_6$Cl$_2$, Ca(NH$_3$)$_8$Cl$_2$ and Sr(NH$_3$)$_8$Cl$_2$.

3. The composition of material of claim 1 wherein the ammonia storage material in its saturated state has a density of 75, more preferred 80 or 85 and even more preferred 90 or more than 90% of the single crystal density of said ammonia storage material in its ammonia saturated state.

4. The composition of material of claim 1 having the form selected from a cylinder, a cube, a block, a pellet and a tablet.

5. A method of preparing the self-supporting solid compacted composition of material comprising an ammonia storage material reversibly absorbing and desorbing ammonia according to claim 1 having in its ammonia saturated state a density of at least 70% of the single crystal density of said material in its ammonia-saturated state in admixture with an additive of carbon fibers incapable of storing ammonia and having a thermal conductivity of at least five times the thermal conductivity of the ammonia storage material at a temperature of from at least −45° C. to 250° C.:

a) providing a solid ammonia storage material reversibly absorbing and desorbing ammonia in its ammonia-saturated state;

b) mixing the material of a) with the additive incapable of storing ammonia and having a thermal conductivity of at least five times the thermal conductivity of the ammonia storage material at a temperature of from at least −45° C. to 250° C.;

c) compacting said mixture to a degree wherein said ammonia storage material in its ammonia saturated state has a density of at least 70% of the single crystal density of said material in its saturated state using external pressure.

6. The method of claim 5, wherein solid storage material provided in a) is in the form of a powder material, a granular material, a porous material, a polycrystalline material, an amorphous material or a combination thereof.

7. The method of claim 5, wherein said compacting is performed in a mold using mechanical pressure.

8. The method of claim 5, wherein said self-supporting solid compacted composition of material is subjected to an ammonia degassing in a container.

9. The method of claim 8 wherein after said degassing in said container is connected to an ammonia source for resaturating the ammonia storage material in said composition of material.

* * * * *